No. 690,658. Patented Jan. 7, 1902.
R. G. McAULEY.
TRAP.
(Application filed Mar. 29, 1901.)
(No Model.) 2 Sheets—Sheet 1.
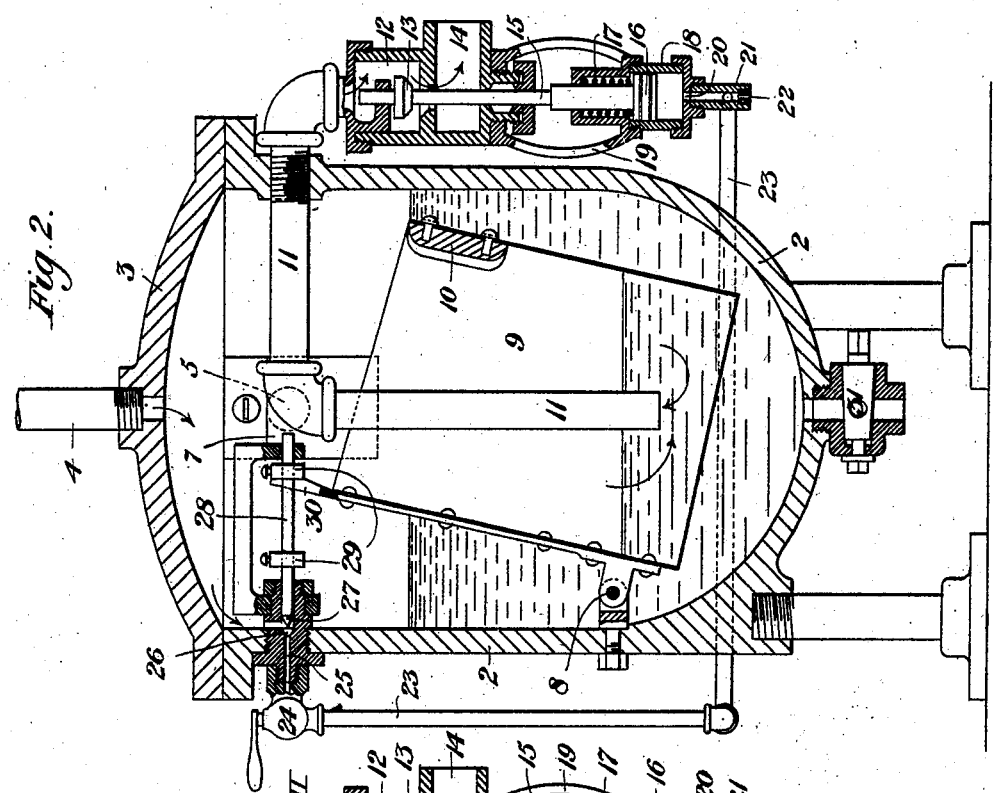
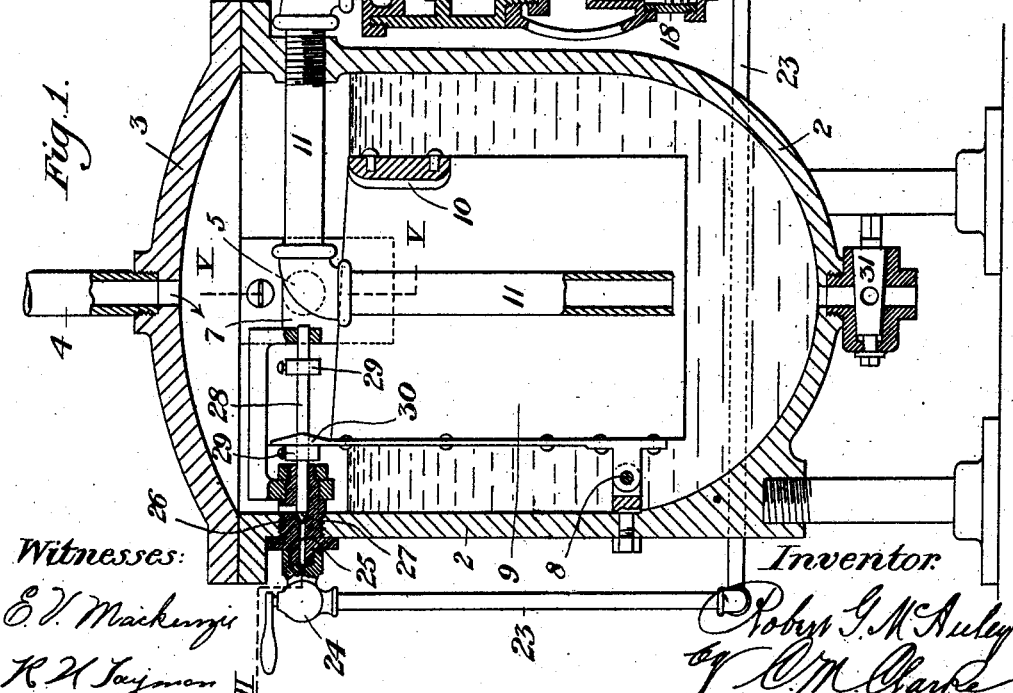
Witnesses: Inventor.

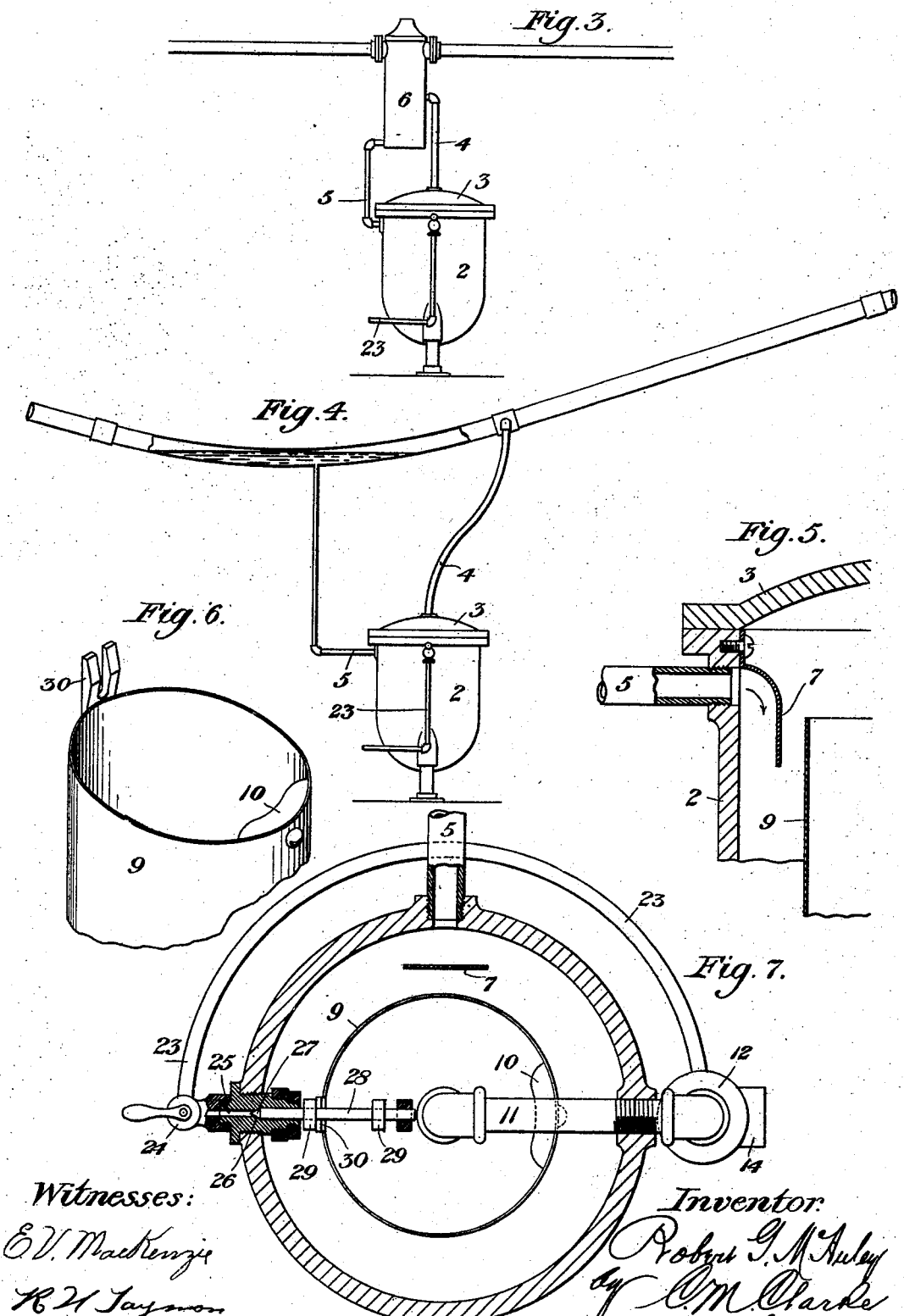

UNITED STATES PATENT OFFICE.

ROBERT G. McAULEY, OF PITTSBURG, PENNSYLVANIA.

TRAP.

SPECIFICATION forming part of Letters Patent No. 690,658, dated January 7, 1902.

Application filed March 29, 1901. Serial No. 53,527. (No model.)

*To all whom it may concern:*

Be it known that I, ROBERT G. MCAULEY, a citizen of the United States of America, and a resident of Pittsburg, county of Allegheny, State of Pennsylvania, have invented certain new and useful Improvements in Traps, of which the following is a specification, reference being had to the accompanying drawings, forming part of this specification, in which—

Figure 1 is a vertical sectional view of my improved gravity-trap. Fig. 2 is a similar view showing the inner receptacle tilted and establishing steam communication with the piston of the outlet-valve. Fig. 3 is a view in side elevation showing the application of the trap to a steam-line. Fig. 4 is a similar view showing its application to a gas-line. Fig. 5 is a sectional detail view indicated by the line V V of Fig. 1. Fig. 6 is a partial perspective view of the tilting bucket. Fig. 7 is a horizontal cross-sectional view indicated by the line VII VII of Fig. 1.

My invention relates to the class of traps for collecting and disposing of water of condensation or other liquid accumulation; and it consists in a trap adapted to receive liquid and to automatically empty by the operation of a gravity-actuated interior bucket adapted to operate valve mechanism whereby the exhaust-opening is opened and closed, so as to permit a constant fluid-pressure to discharge the contents of the trap.

Referring now to the drawings, 2 represents the main shell of the trap, to the top 3 of which or at any other suitable location above the water-line is connected a pipe 4, communicating with any constant source of fluid-pressure, as a steam or gas conductor. Connected with the shell 2, also at any convenient location above the water-line, is a water-supply or drain pipe 5, leading from any point in the line of pipe or vessel, as a separator 6, by which pipe water of condensation is carried to the interior of the trap, and for the purpose of deflecting such water downwardly, so that it will not flow directly into the bucket, I employ an arresting or deflecting shield 7, which shrouds the inner end of the opening, as shown.

Pivotally mounted, as by a hinge-joint 8, upon the inner side of the case is a bucket 9, located about centrally of the interior, the opening at the top of which is preferably slanted downwardly toward one side, so that the water as it rises within the case around the exterior of the bucket will flow over such lower side, and so fill the bucket. This bucket by reason of its buoyancy will float upon the water and be maintained in an erected position until so filled, when it will tip downwardly away from the hinge 8, as shown in Fig. 2, permitting the water to flow into it and to be exhausted from the case down to the level of such lower edge of the bucket, as shown in Fig. 2, in the manner I shall hereinafter more fully describe. For the purpose of facilitating the tilting action a weight 10 of suitable size may be attached to the inner upper edge of the bucket in any convenient manner.

11 is an outlet-pipe extended down within the interior of the case and of the bucket to within a short distance of its bottom when raised, as shown in Fig. 1, and such outlet-pipe extends through the side of the case and communicates with the upper side of a valve-chamber 12 above a vertically-moving valve 13, located within the case and adapted when raised, as shown in Fig. 2, to establish communication from the interior of the bucket through pipe 11, valve-case 12, and its outlet-opening 14, which may lead to any suitable point of discharge.

The valve-stem 15 of valve 13 is connected at its lower end with a piston 16, which piston is normally held down, so as to seat the valve, by a spring 17, surrounding its stem, the piston being mounted in a cylinder 18, connected by suitable framework 19 with the valve-case 12, and proper packing being provided for the piston and for stem 15. It will be also noted that the area of piston 16 is greater than that of valve 13 and its stem, thus facilitating the opening of the valve. This construction of piston and valve, the parts being in alinement and of simple construction, by which the valve is opened directly against the pressure, so as to give free communication to the atmosphere, is of great advantage in practical operation and is very simple in form.

By means of a port 20 through the bottom of the cylinder 18 communication is established to a coupling 21, the lower end of which is preferably provided with a very small draining-port 22, and the coupling is connected with a pipe or other suitable connection 23, which communicates, preferably through an angle-valve 24, with a port 25, leading to the interior of the case. The inner end of this port terminates in a valve-seat 26, adapted to be closed by valve 27, which valve is formed or made on the end of a reciprocating stem 28, mounted in suitable bearings in the interior of the case.

The valve-stem 28 is provided with adjustable abutments 29, between which a bifurcated arm 30 is adapted to play and to move the valve-rod in or out by action against the abutments. This bifurcated arm is attached to and extends from the edge of the bucket 9, as shown, and in operation when the bucket is buoyantly held up the valve will be maintained closed, relieving pressure from piston 16 by cutting off the steam-supply, keeping the outlet-valve 13 seated, and allowing excess pressure or water of condensation to escape through port 22. When, however, water in the interior of the case has risen sufficiently high to overflow into the bucket and tip it by reason of the specific gravity of the bucket itself and its counterweight, the tipping action of the bucket and the corresponding movement of the bifurcated arm 30 upon the valve 27 will open it and establish pressure to piston 16, raising valve 13, whereupon the pressure within the case through the pipe 4 will force the fluid contents of the bucket outwardly through pipe 11 until the level is lowered down to the lower end of the pipe 11, when the bucket will float upwardly, closing the valve and maintaining it so closed until the operation is again repeated.

The case 2 is provided at its lower point with a drain-cock 31, by which the case may be emptied and accumulation of dirt or other foreign material drained off, and a feature of advantage in the construction is that all such accumulation of foreign material will settle to the bottom of the case, the clear water only rising and flowing into the bucket, so that no foreign material will pass through the pipe 11 to the outlet-valve, whereby it is constantly maintained in a clear and operative condition.

The device may be used to drain any pipe or vessel where a pressure may be had, and in its operation it is very efficient and reliable, obviating the objections of other kinds of traps for this purpose, and it will be found by those accustomed to this class of mechanism to give continuous and satisfactory results.

The invention is very simple in construction, compact in size, and symmetrical in form, economical to build, and not liable to get out of order.

While the form I have shown is well adapted to the objects in view, it will be understood that various changes and modifications may be made in its construction or design by the skilled mechanic without departing from my invention as embodied in the following claims.

What I claim, and desire to secure by Letters Patent, is—

1. A trap consisting of a case adapted to contain fluid under pressure, a pivotally-mounted movable vessel therein, a valve-controlled exhaust-opening leading outwardly from the case, a valve therefor, a piston-chamber and a piston connected with the valve, a pipe leading from the piston-chamber to the interior of the case, a valve controlling the outlet through such pipe, and means for opening and closing such valve by movement of the vessel.

2. A trap consisting of a case adapted to contain fluid under pressure, a vessel tiltingly mounted therein, and an outlet-pipe extending from within such vessel outwardly through the case and communicating with an outlet-opening provided with a valve, a piston connected with the valve, a pipe leading from the piston-chamber to the interior of the case, a valve controlling the outlet through such pipe, and means for opening and closing such valve by movement of the vessel.

3. A trap consisting of a case adapted to contain fluid under pressure, a vessel tiltingly mounted therein, and an outlet-pipe extending from within such vessel outwardly through the case and communicating with an outlet-opening provided with a valve, a piston connected with the valve, a pipe leading from the piston-chamber to the interior of the case, a valve controlling the outlet through such pipe, and an arm attached to the tilting vessel and adapted to operate such valve in conformity with its own movement.

4. A trap consisting of a case adapted to contain fluid under pressure, a vessel tiltingly mounted therein upon a pivotal bearing on the inner side of the case, an outlet-pipe extending into the interior of the case and downwardly into the tilting vessel and outwardly through the case to an outlet-valve, an outlet-valve controlling the outlet-pipe provided with a piston within a chamber, a pipe leading from the chamber of such piston to a valve-controlled opening communicating with the interior of the case, a movable valve for closing such opening and means connected with the tilting vessel for operating such valve.

5. A trap consisting of a case adapted to contain fluid under pressure, a vessel tiltingly mounted therein upon a pivotal bearing on the inner side of the case, an outlet-pipe extending into the interior of the case and downwardly into the tilting vessel and outwardly through the case to an outlet-valve, an outlet-valve controlling the outlet-pipe, provided with a piston within a chamber, a pipe leading from the chamber of such piston to a valve-controlled opening communicating with the interior of the case, a movable valve for closing such opening, provided with abutments, and an arm connected with the tilting vessel adapted to contact with said abutments to open or close the valve by falling or rising movement of the vessel.

6. A trap consisting of a case adapted to contain fluid under pressure, a vessel tiltingly mounted therein upon a pivotal bearing on the inner side of the case, an outlet-pipe extending into the interior of the case and downwardly into the tilting vessel and outwardly through the case to an outlet-valve, an outlet-valve controlling the outlet-pipe provided with a piston within a chamber, a pipe leading from the chamber of such piston to a valve-controlled opening communicating with the interior of the case, a movable valve for closing such opening, provided with abutments adjustably secured on the valve-stem, and a bifurcated arm connected with the tilting vessel, embracing the stem and adapted to open or close the valve by falling or rising movement of the vessel.

7. In a trap, the combination of a case, a fluid-pipe and a pressure-pipe connected therewith, a vessel tiltingly mounted therein, a valve adapted to be abruptly opened and closed by movement of the tilting vessel at the limit of its travel downwardly and upwardly, a pipe leading from said valve to a piston-chamber, a piston therein provided with a stem and a valve for controlling an exhaust-opening, and a pipe leading from the interior of the tilting vessel to such valve-controlled exhaust-opening.

8. In a trap, the combination of a case, a condensation-pipe leading thereinto, a pressure-pipe connected with the case, a vessel tiltingly mounted within the case, an opening from the interior of the case provided with a valve-seat, a valve adapted to fit therein and to be abruptly opened and closed by movement of the tilting vessel at the limit of its travel downwardly and upwardly, a pipe leading from said valve-controlled opening to a piston-chamber outside of the case, a piston therein provided with a stem carrying a valve controlling an exhaust-opening, and a pipe leading from the interior of the tilting vessel to such valve-controlled exhaust-opening.

9. In a trap of the class described, provided with a case and means for charging liquid thereinto, and for providing a fluid-pressure upon such liquid contents, a tilting vessel adapted to buoyantly rise, and to fall when filled by overflow, provided with an abutment for actuating a valve to establish pressure communication through a conduit leading to means for actuating an exhaust-opening, and an outlet-pipe leading from within the vessel outwardly through the case to such exhaust-opening whereby the contents of the vessel are discharged by internal pressure when the vessel tilts downwardly.

10. In a trap of the class described provided with a piston-chamber, a piston therein carrying a valve controlling an exhaust-opening, and a pressure-conduit leading from the interior of the case through a valve-controlled opening to the piston-chamber; a reduced drain-opening communicating with the piston-chamber.

Signed at Pittsburg this 6th day of March, 1901.

ROBERT G. McAULEY.

Witnesses:
PETER J. EDWARDS,
C. M. CLARKE.